United States Patent
Young

[11] Patent Number: 6,145,237
[45] Date of Patent: Nov. 14, 2000

[54] UNITARY FISHING ROD WITH INTEGRAL FEATURES

[75] Inventor: John Newton Young, Fairfax, Calif.

[73] Assignee: Charles C. Worth Corporation, San Rafael, Calif.

[21] Appl. No.: 09/048,875

[22] Filed: Mar. 26, 1998

[51] Int. Cl.[7] ................................................. A01K 87/00
[52] U.S. Cl. .................................................. 43/18.1
[58] Field of Search ................................ 43/18.1, 18.5

[56] References Cited

U.S. PATENT DOCUMENTS

| | | | |
|---|---|---|---|
| 4,422,259 | 12/1983 | Shimano | 43/18.1 |
| 4,920,682 | 5/1990 | Andreasen et al. | 43/22 |

FOREIGN PATENT DOCUMENTS 1172665  6/1968  United Kingdom.

*Primary Examiner*—Michael J. Carone
*Assistant Examiner*—Darren W. Ark
*Attorney, Agent, or Firm*—Meyer Intellectual Property Law; Virginia H. Meyer, Esq.; Mark J. Spolyar, Esq.

[57] ABSTRACT

A unitary fishing rod with integral features is described. Integral features, such as, raised or recessed surface details, both raised and recessed surface detail, circular or non-circular cross-sectional shapes, raised rod guide mounting portion, multiple axes of alignment, distinct handle gripping means, one or more internal ribs, solid tip piece, and ferrules are formed by the use of a mold where the mold's interior surfaces define the integral features, the shape and surface detail, of the unitary fishing rod.

4 Claims, 17 Drawing Sheets

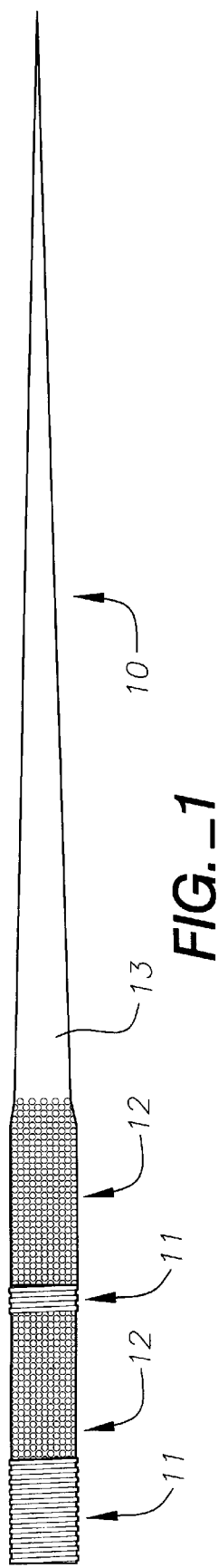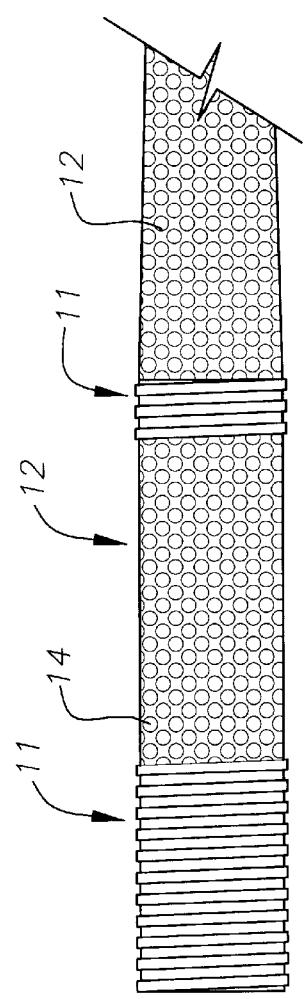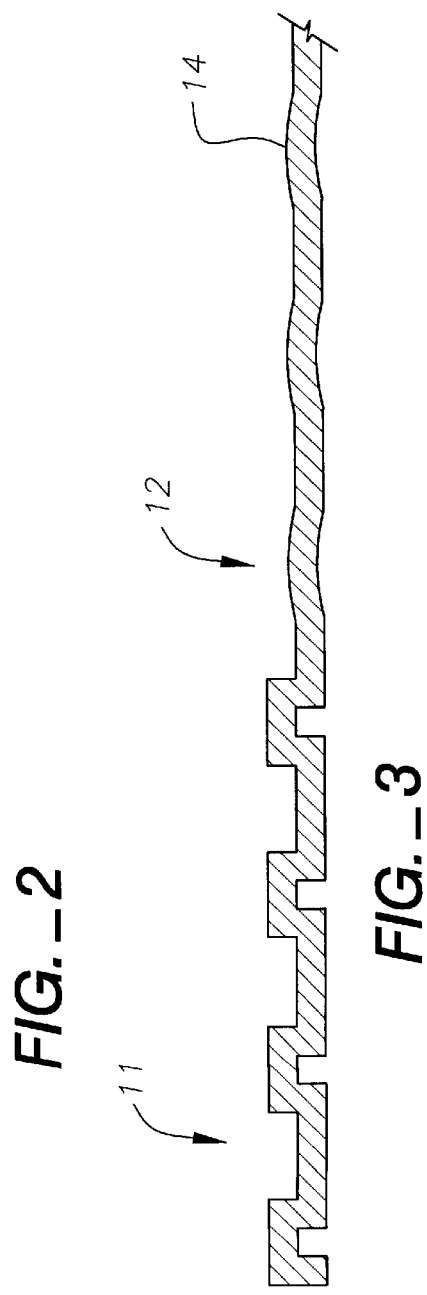

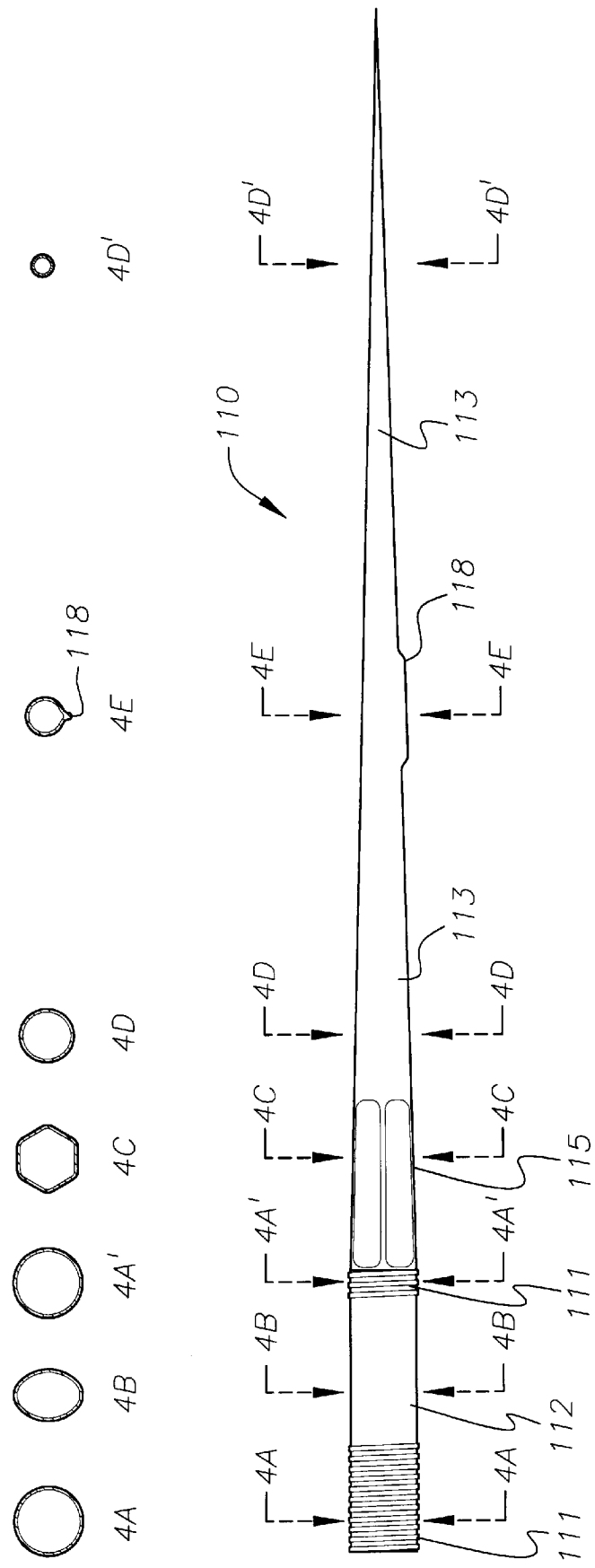
FIG._4

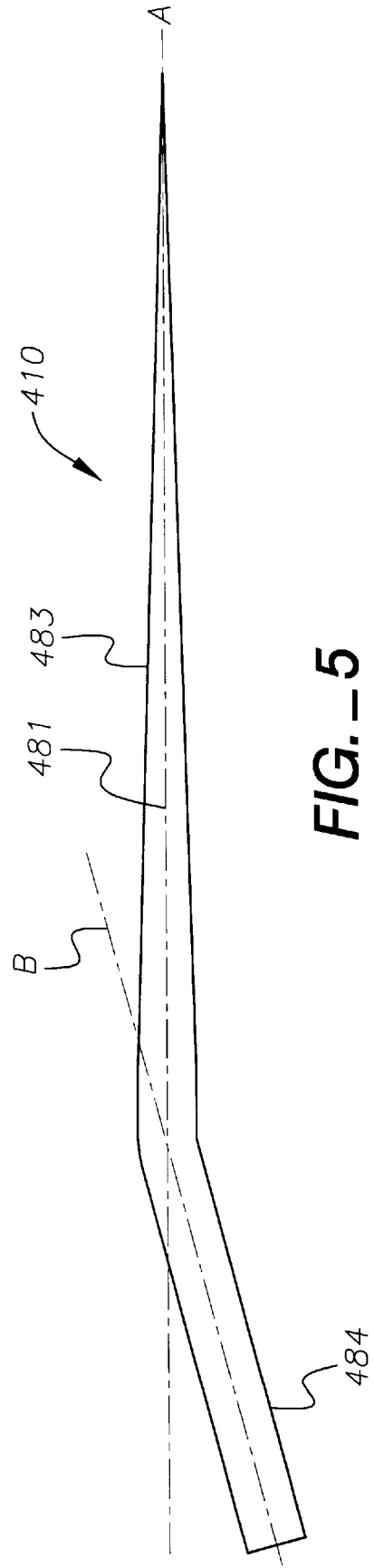

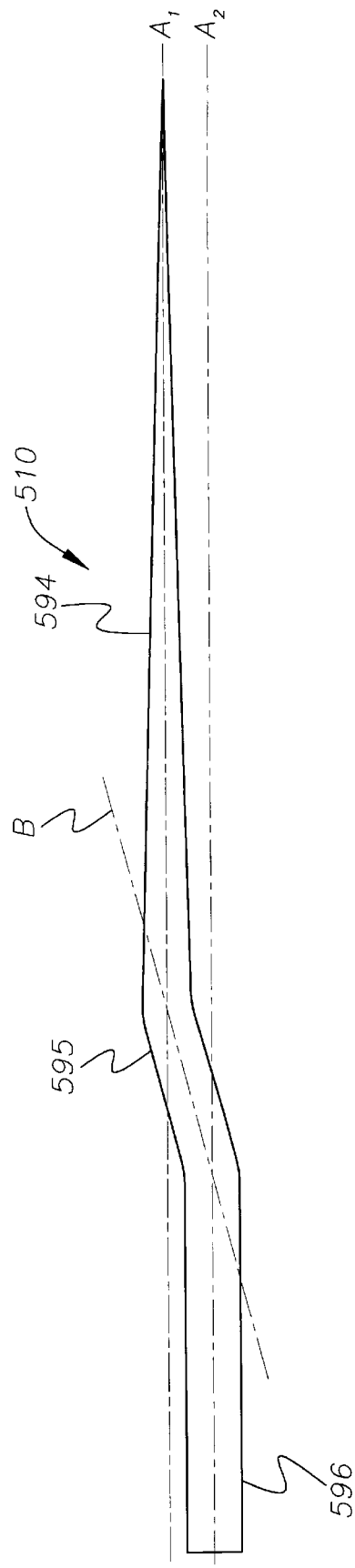
*FIG._6A*
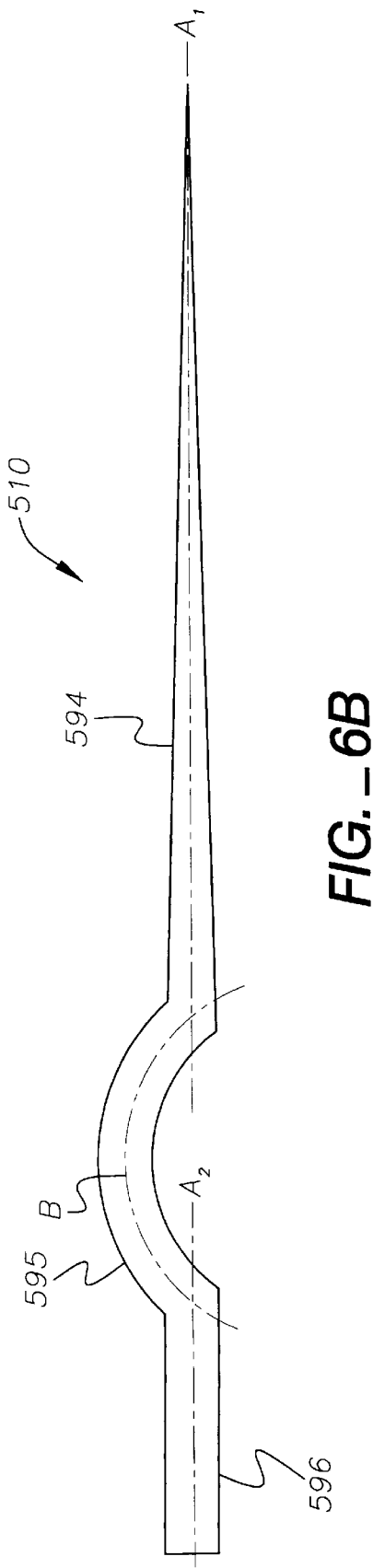
*FIG._6B*

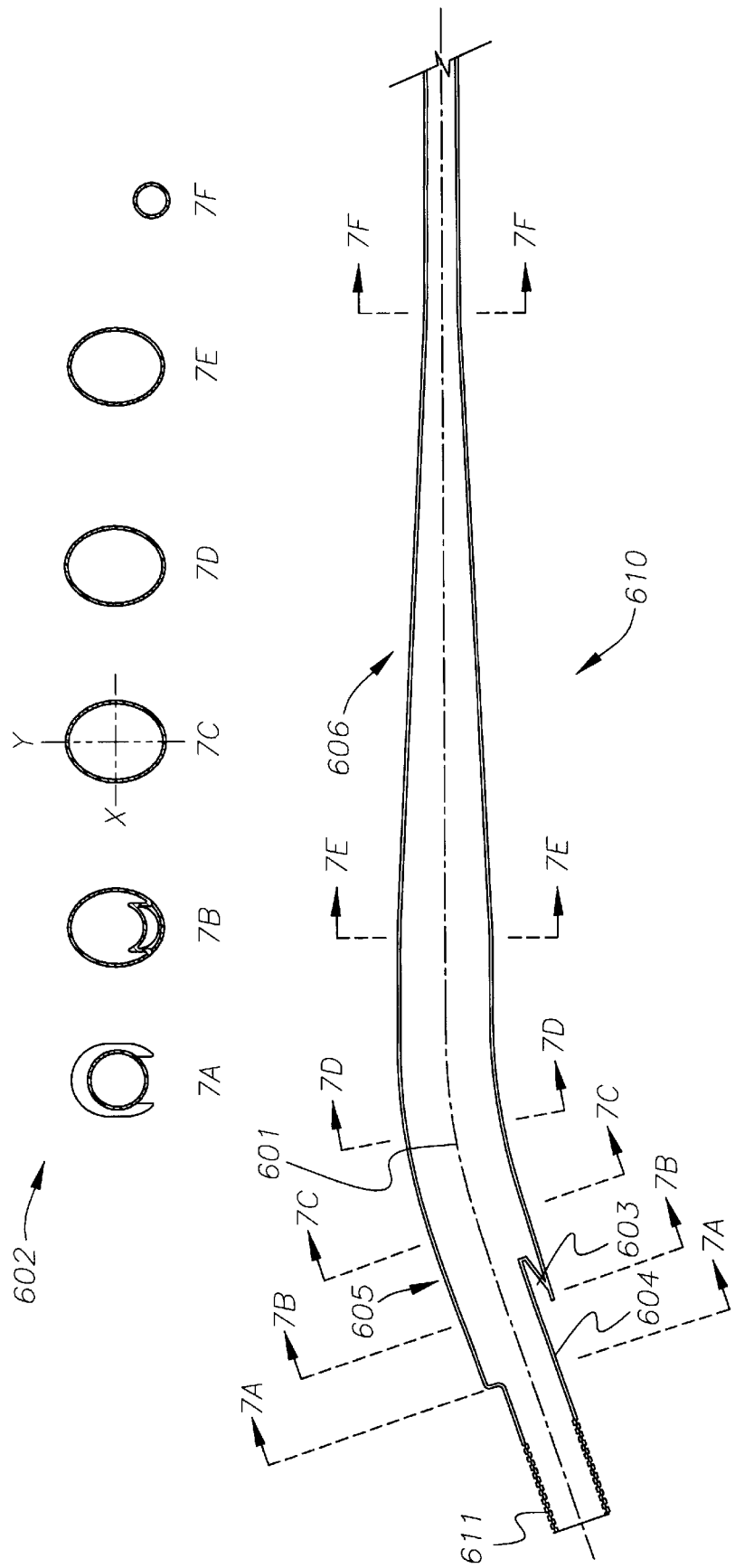
FIG._7

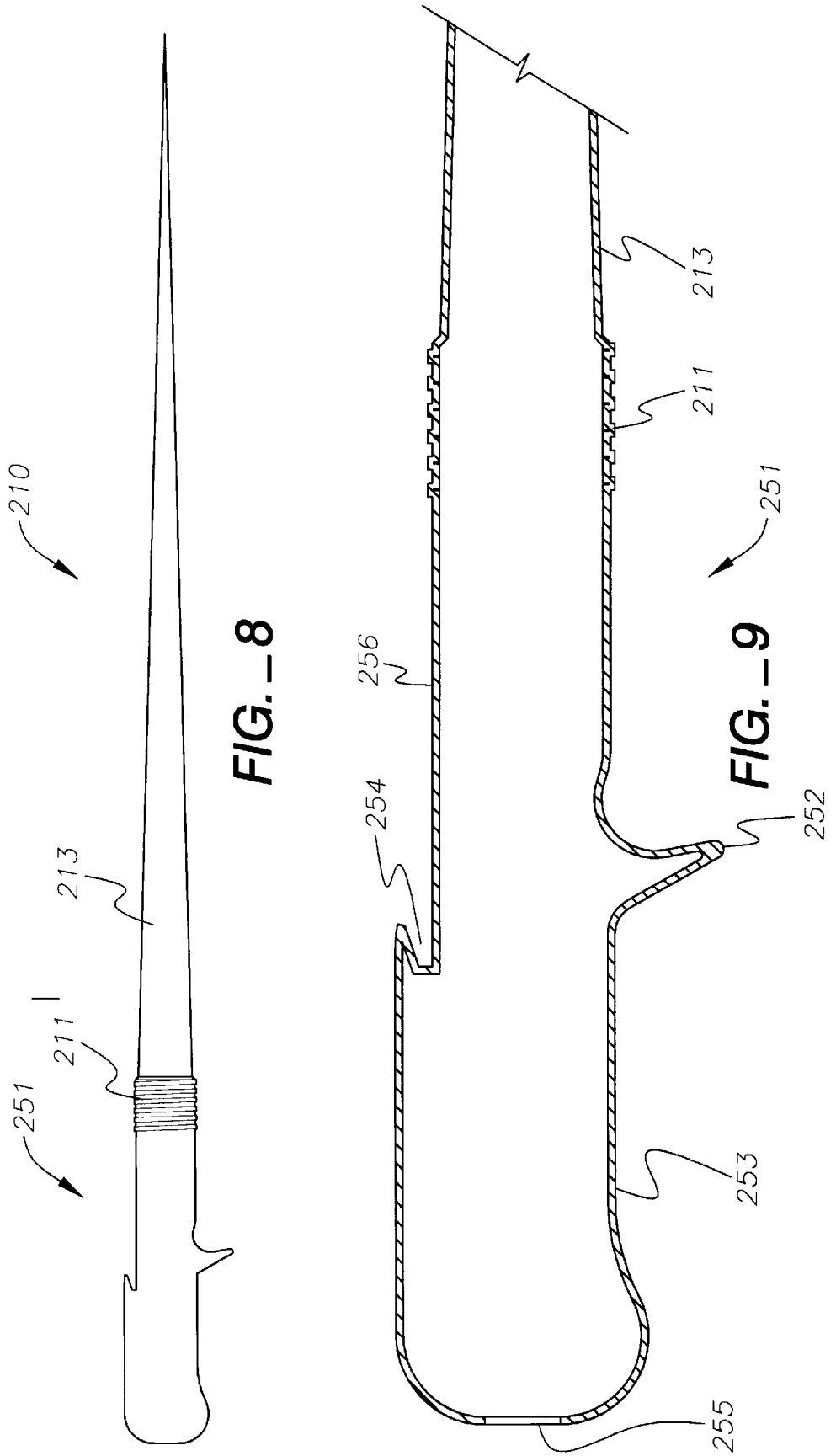

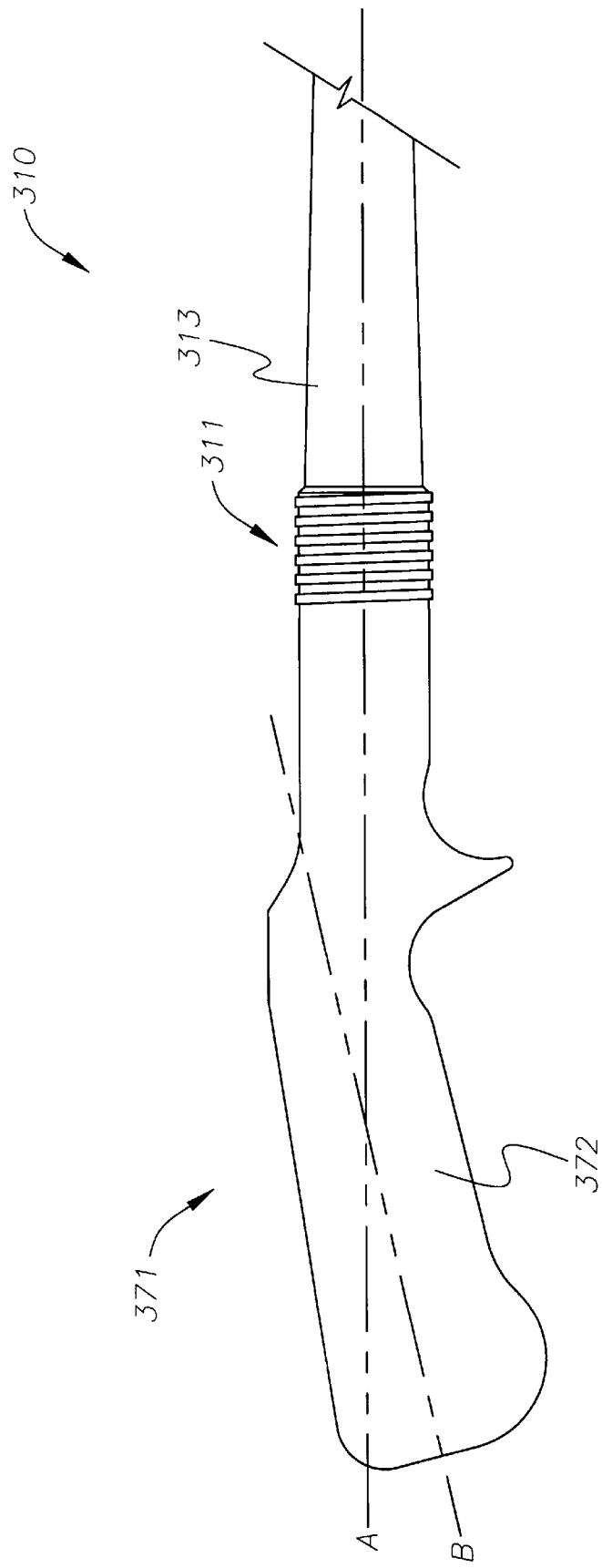
FIG._10

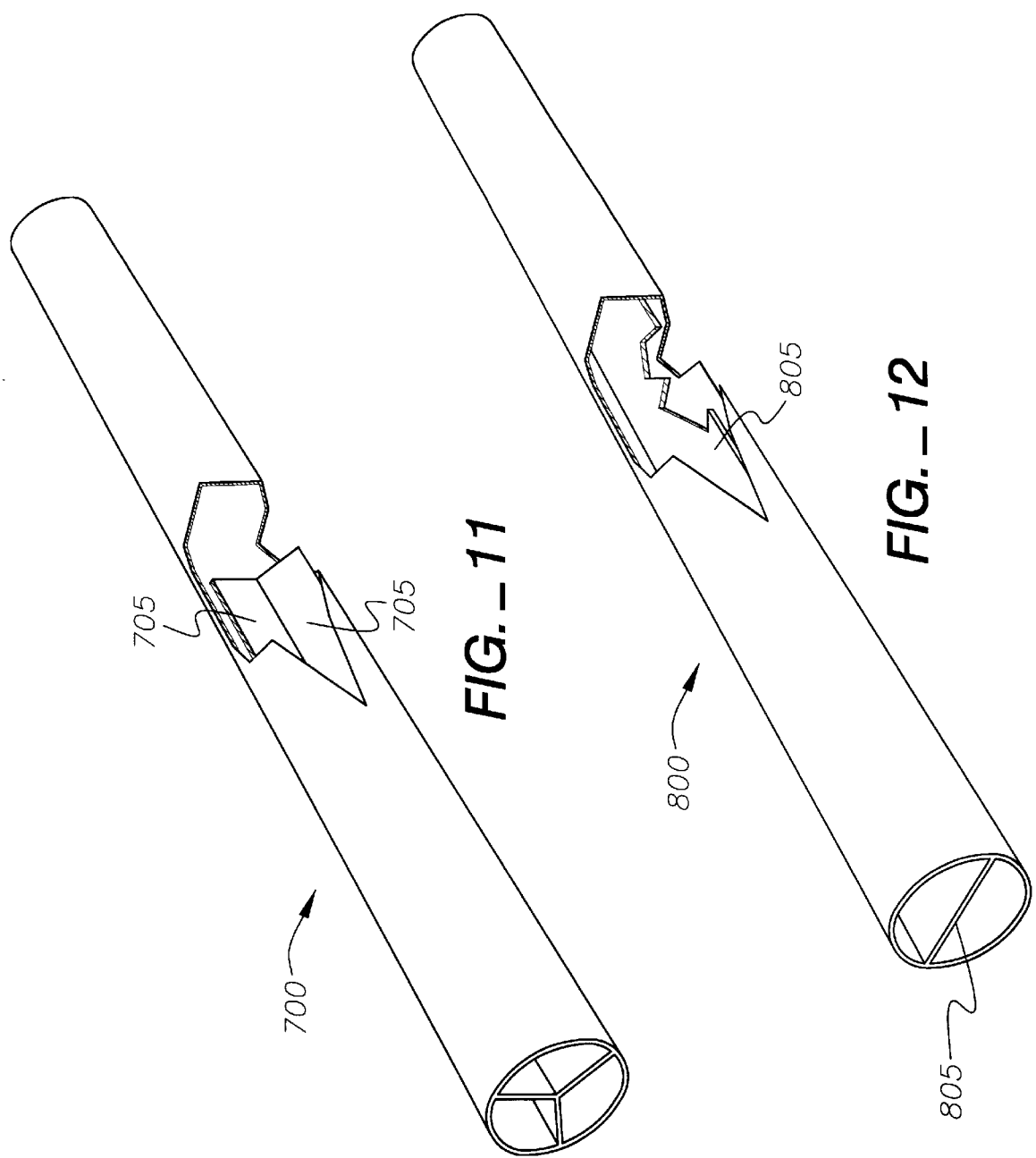

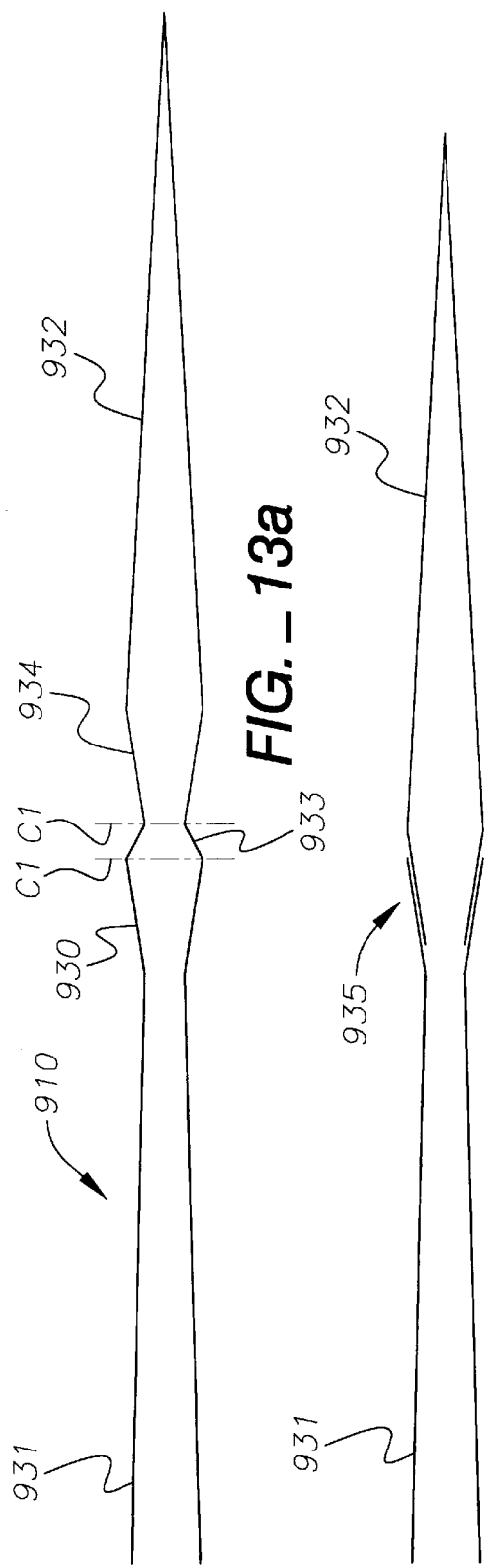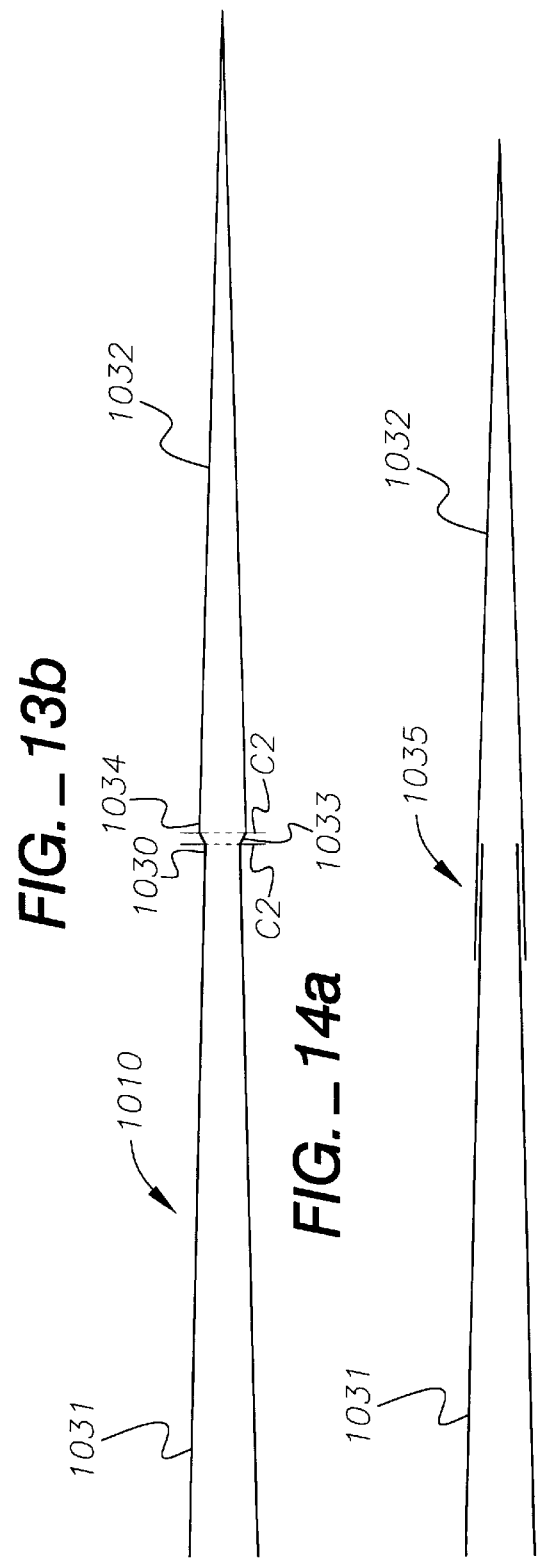

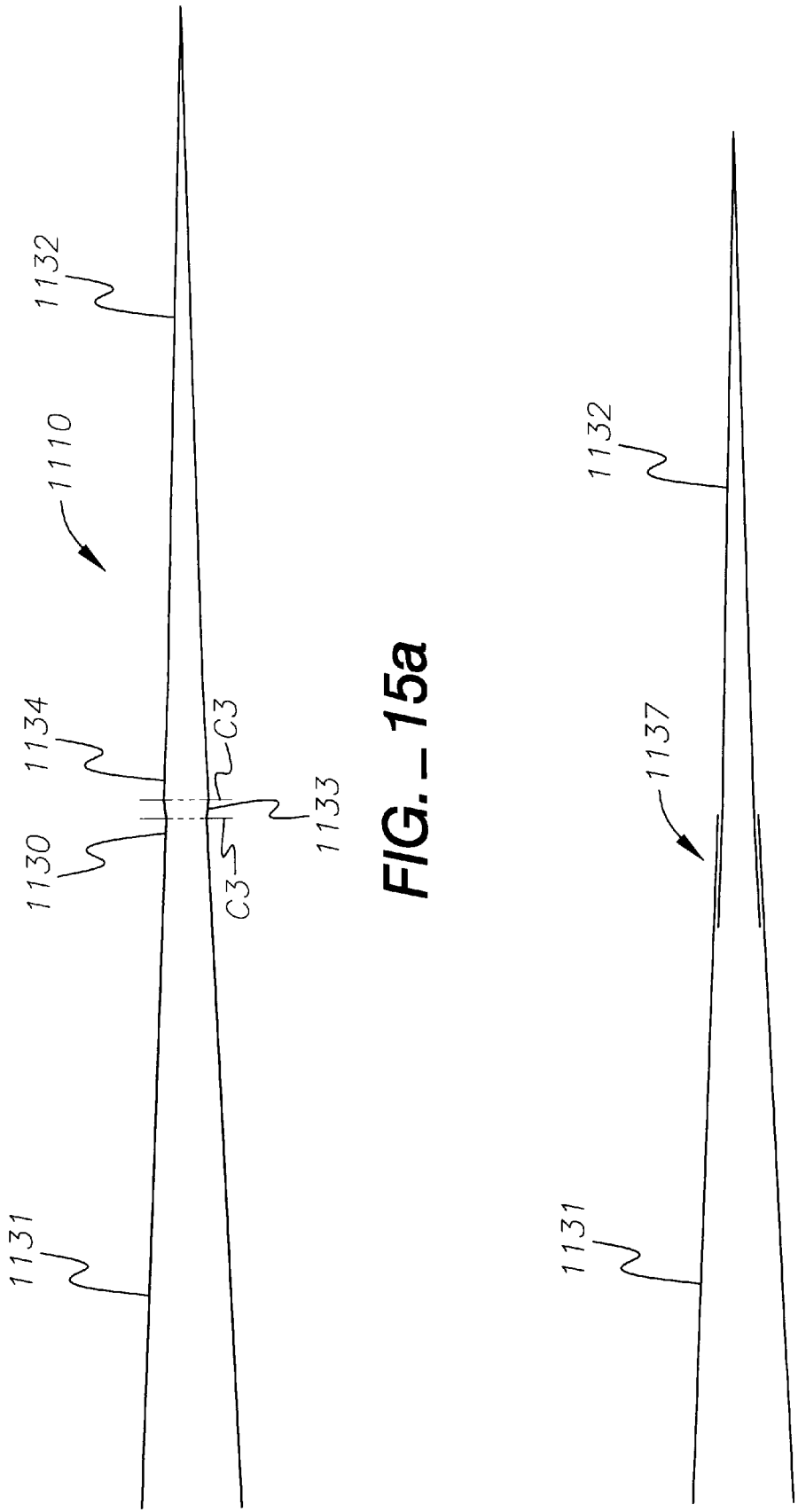
FIG._15a
FIG._15b

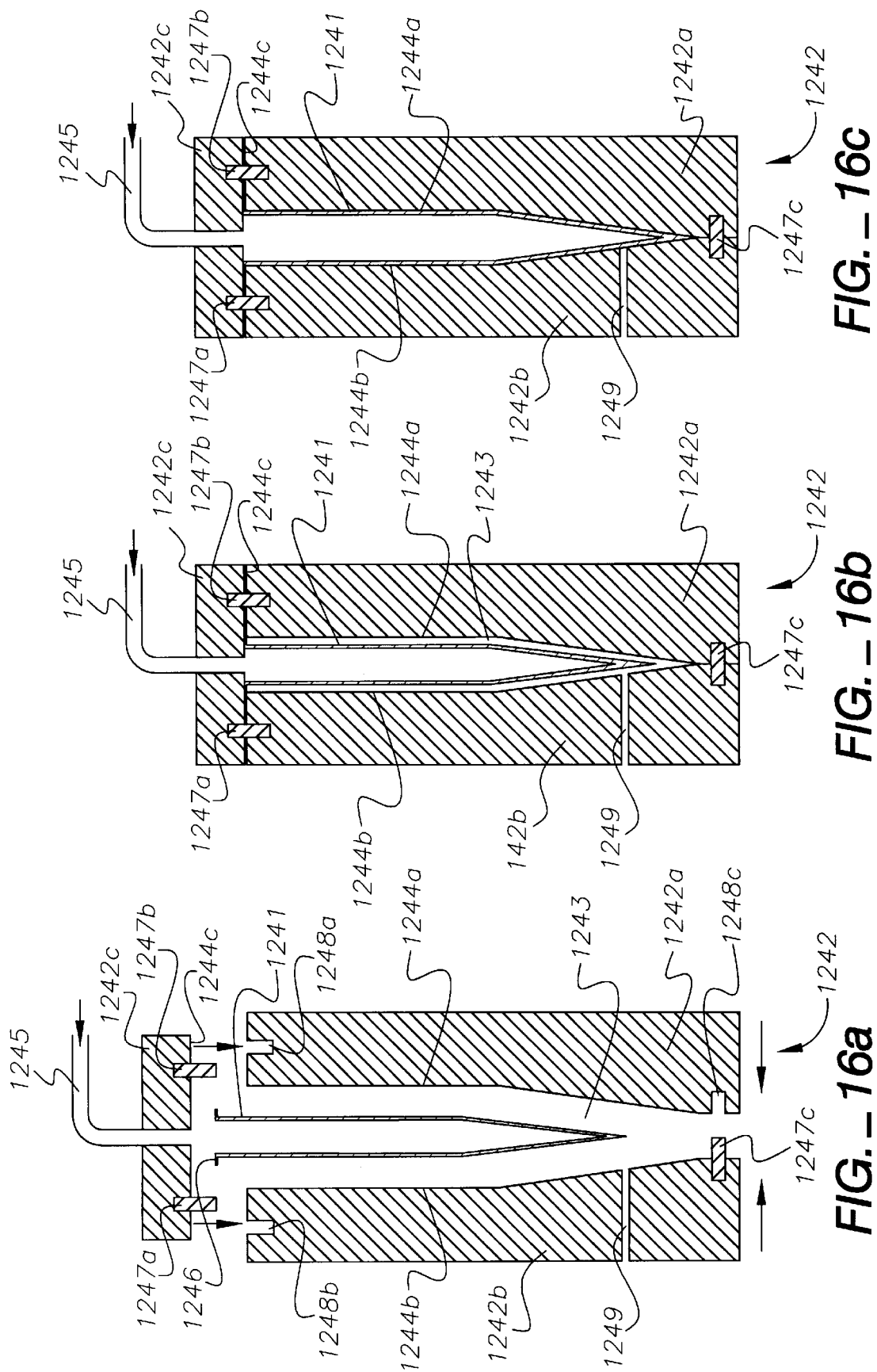

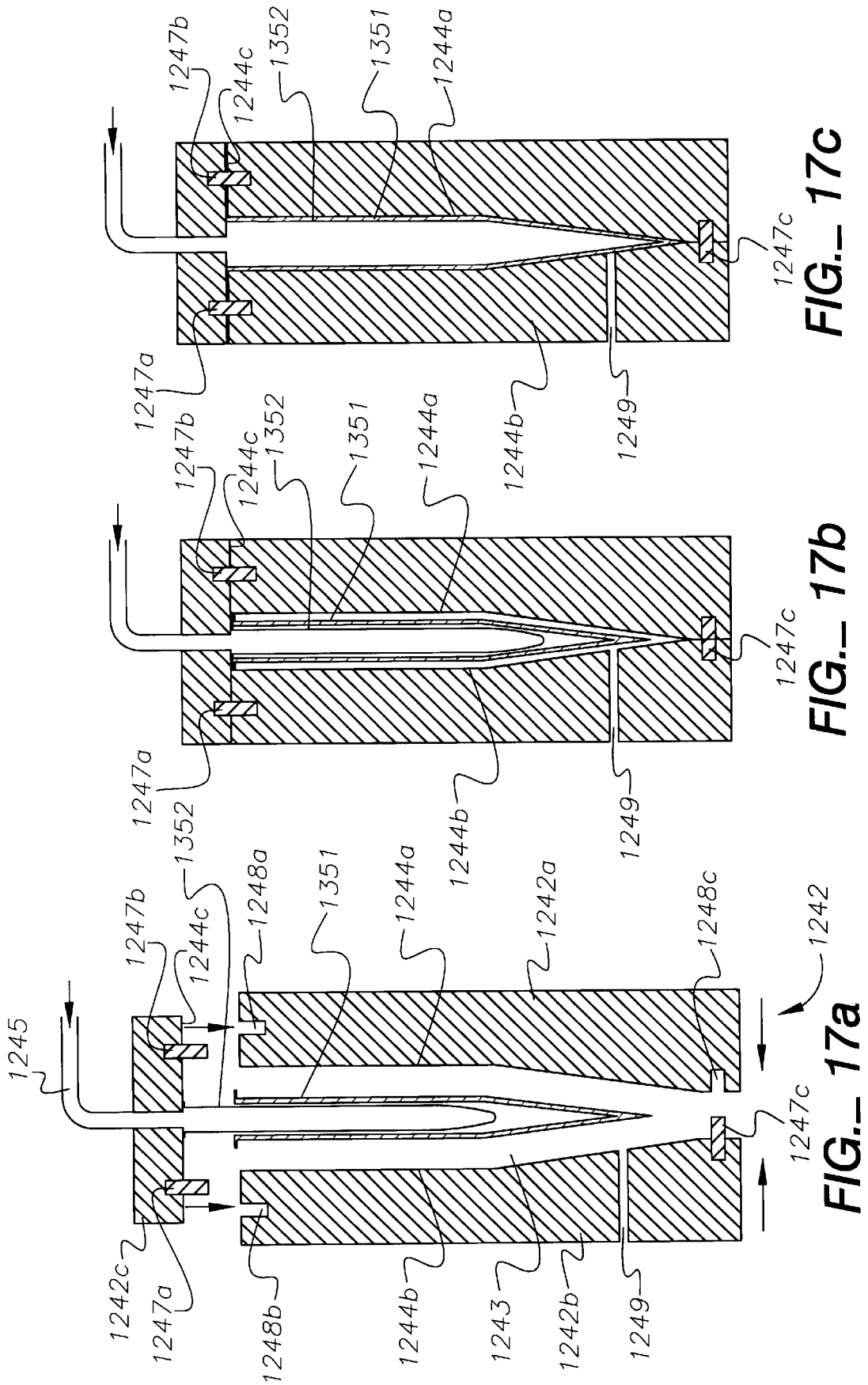

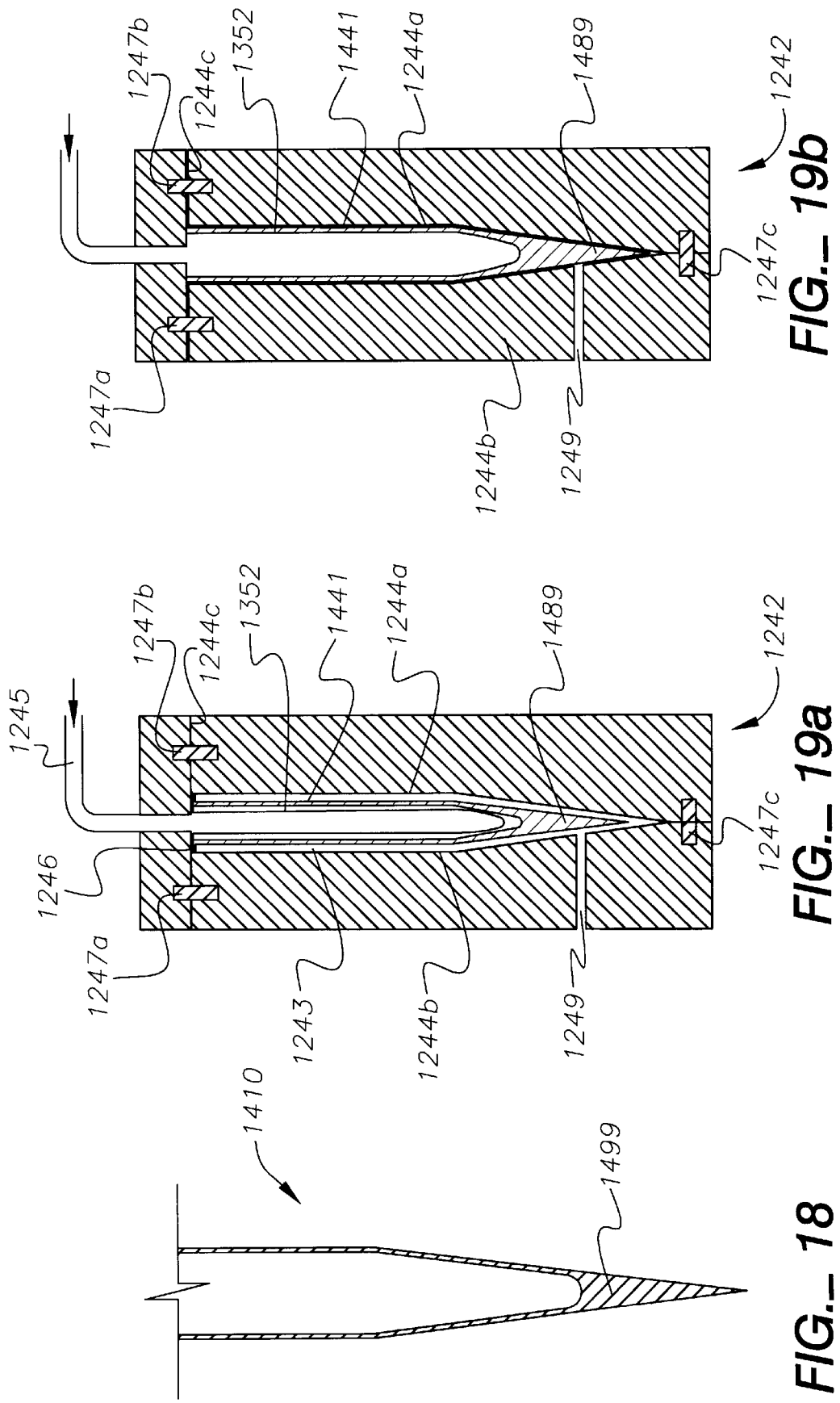

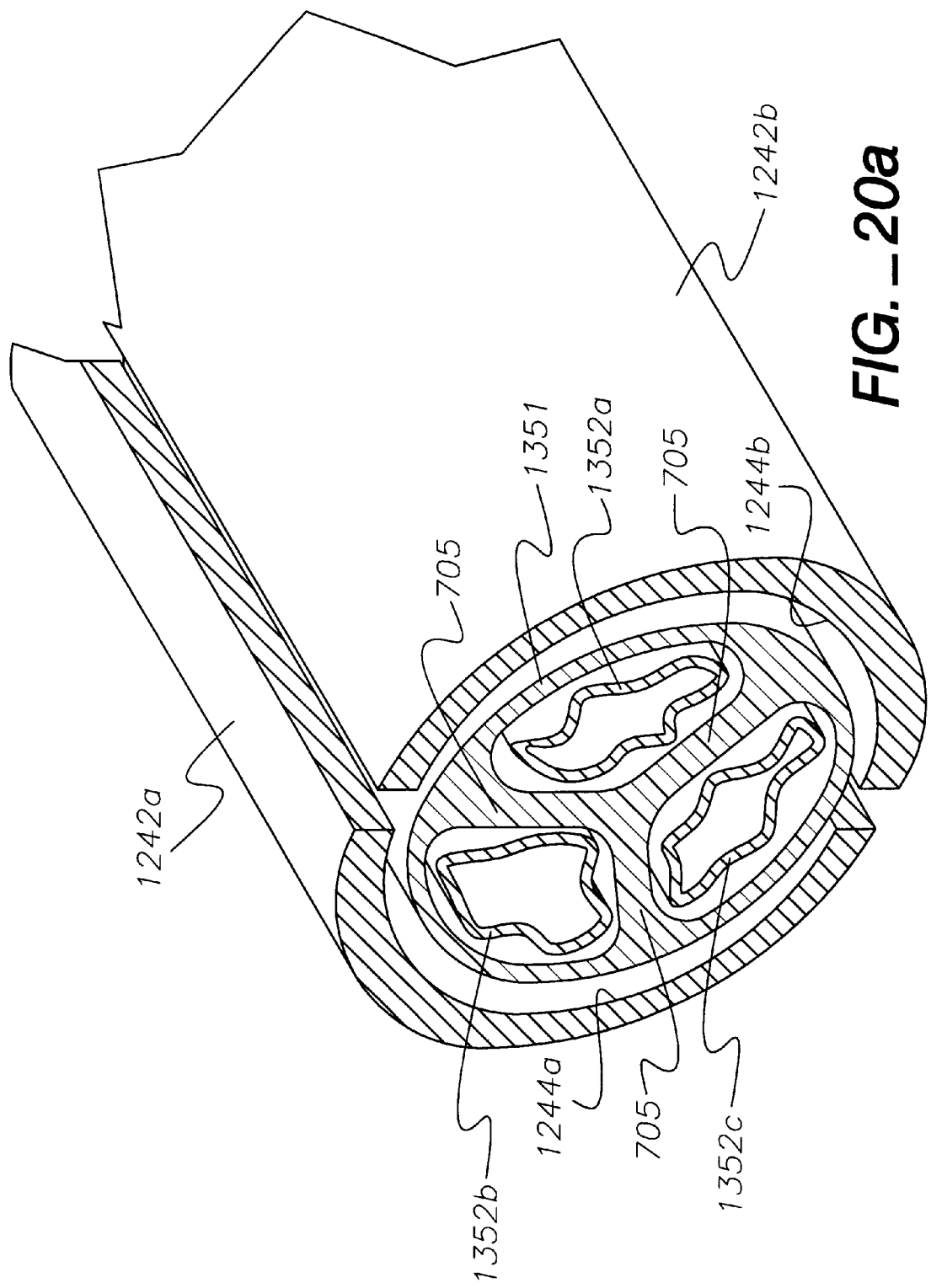

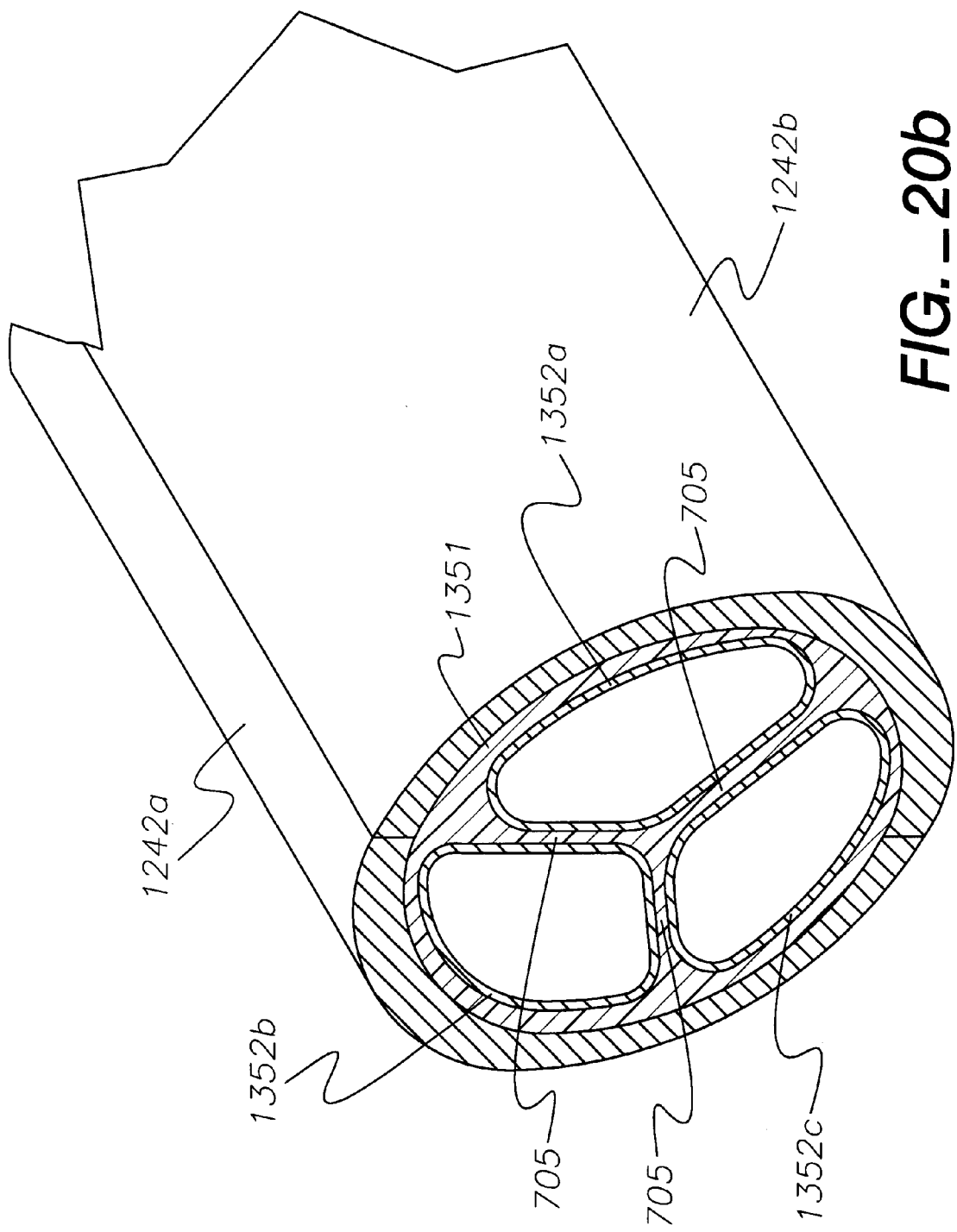

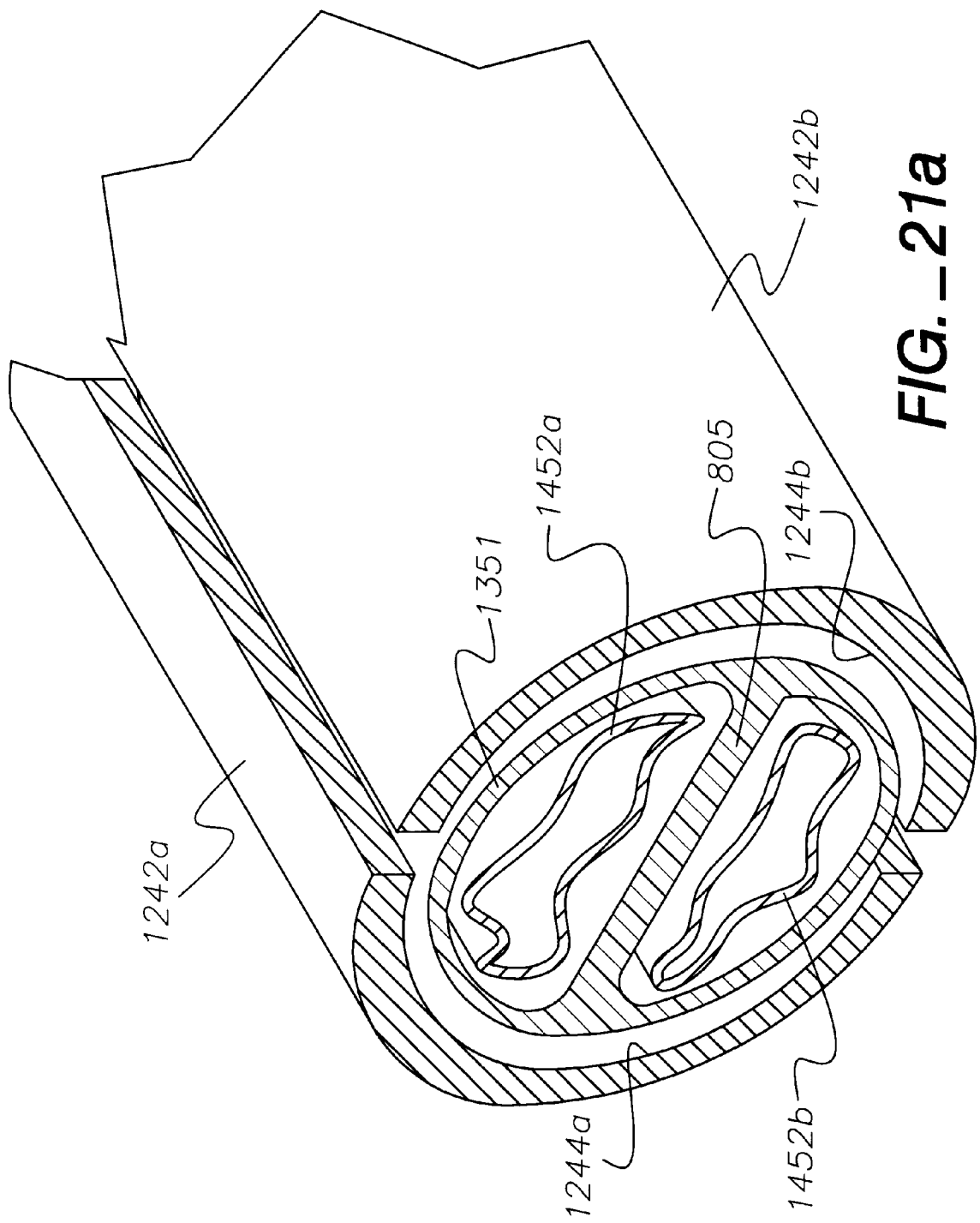

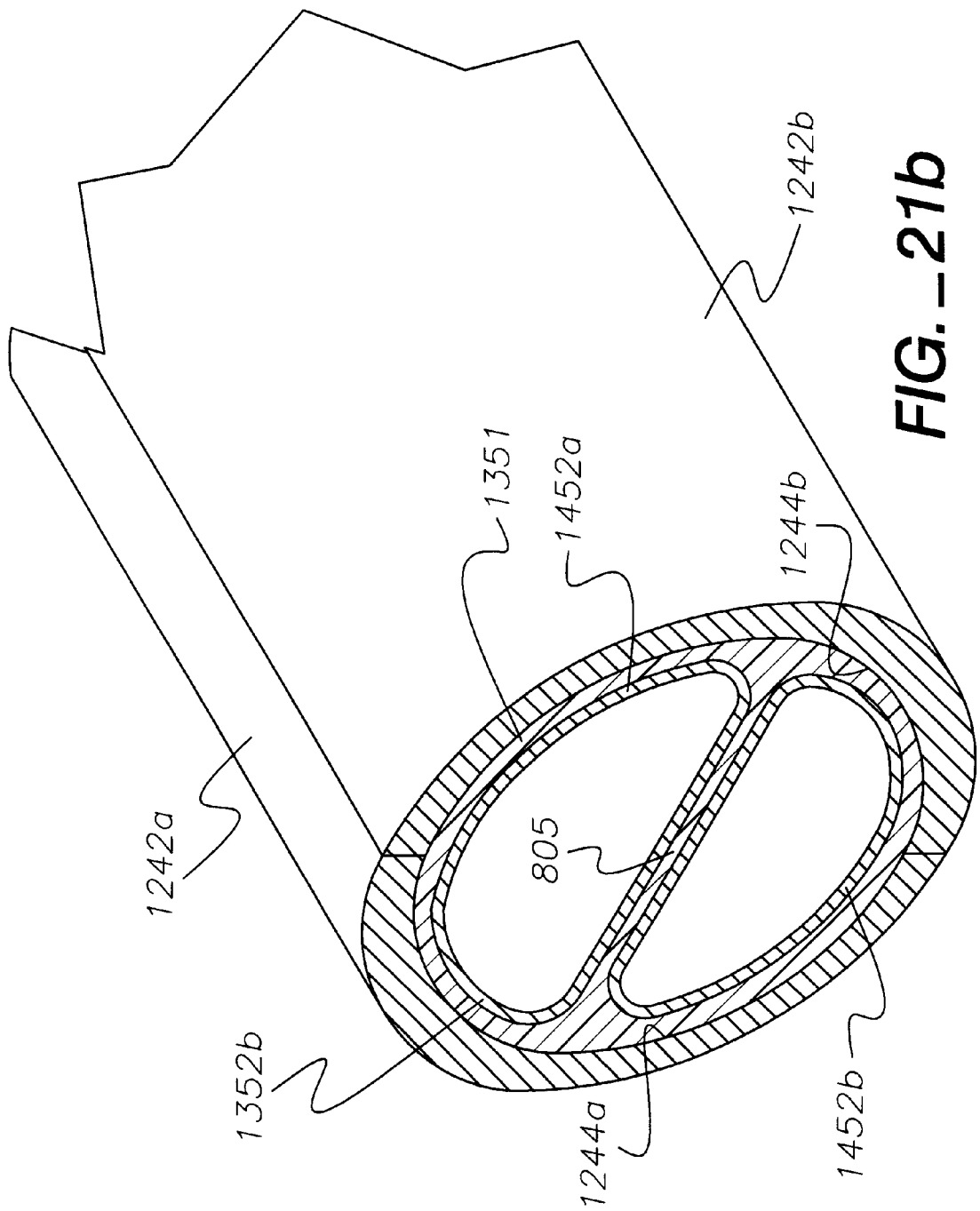

UNITARY FISHING ROD WITH INTEGRAL FEATURES

FIELD OF THE INVENTION

The present invention relates to fishing rods, more particularly, a unitary fishing rod with integral features that are not limited by conventional mandrel wrapped manufacturing methods.

BACKGROUND OF THE INVENTION

Conventional tubular fishing rods are constructed of various materials in a generally conically shaped gradually tapering tube aligned along a single, straight axis. A conventional tubular fishing rod generally has circular cross-sections of varying diameters concentric to the axis extending the full length of the fishing rod.

Typically, conventional tubular rods are manufactured by assembling an appropriate, sized material around a straight, steel mandrel and then baking the assembly in an oven until the material is cured to a rigid state. The mandrel is then removed from the rod, and the rod is then finished by conventional means.

Known tubular fishing rods are restricted in their design by the shape of the mandrel that can be formed and then later removed from the cured blank. Therefore, rods manufactured by mandrel wrapping generally have a single cross-sectional shape, which is usually circular.

Patents U.S. Pat. No. 4,422,259 and GB 1,172,665 teach rods with non-circular cross-sections. However, the rods disclosed in patents U.S. Pat. No. 4,422,259 and GB 1,172,665 are limited in their shape by the mandrel-wound process or a flattened steel tubing process. The rods of U.S. Pat. No. 4,422,259 and GB 1,172,665 also require multiple rod sections to accomplish substantial changes in cross-sectional shape. Multiple sections serve to decrease the stability, strength, and flexibility of the fishing rod.

U.S. Pat. No. 4,422,259 discloses a fishing rod that requires three sections to achieve both an elliptic or approximately elliptic cross-section and a round cross-section in the same rod. The first section is elliptic or approximately elliptic, the tip of the second section is round or approximately round, and the third section acts to connect the first and second sections by transitioning from an elliptic or approximately elliptic cross-section, to a round or approximately round cross-section.

GB 1,172,665 discloses a fishing rod constructed of tubular steel. Various cross-section shapes are achieved by flattening the tubular steel. Multiple rod sections must be constructed and then connected to achieve more than one cross-sectional shape along the axis of the fishing rod.

Conventional tubular fishing rods are often finished by covering selected areas of the rod with high-friction coatings or materials to enhance hand gripping. Conventional fishing rod handles are typically coated in selected areas with the same or similar friction coatings to enhance hand gripping. Selectively covering conventional rods with high-friction coatings or material presents disadvantages. Firstly, the manufacturing cost of the rod is increased due to the cost of high-friction coatings or materials and the labor costs of applying these substances. Secondly, the high-friction coatings or materials adds weight to a conventional fishing rod.

Rod blanks manufactured by conventional mandrel wrapping are restricted in their design to a single axis of alignment. The single axis of alignment creates a straight rod which is necessary to facilitate removal of the mandrel from the cured rod blank.

Rods manufactured by conventional mandrel wrapping are restricted in their design to be hollow. Therefore, conventional rods are typically hollow without internal ribs.

Conventional fishing rod handles are typically manufactured separately from conventional rods and are made in a variety of forms and materials. The handles are fixed in axial alignment to the rod to provide both a means for attaching the reel to the rod and a means for fishermen to grip the rod. Handle shapes are generally straight or bent with various circular or non-circular axial cross-sectional profiles.

It is common to glue or otherwise fix to conventional tubular fishing rods any of a variety of handles. Often, conventional rods and their attached handles are not dimensionally matched. Consequently, adaptors are commonly fixed between conventional fishing rods and the handle to both compensate for unmatched diameters and to add strength and stiffness to the fishing rods in the handle area. The addition of a fishing rod handle adds weight and substantial processing cost to the rod.

U.S. Pat. No. 4,920,682 discloses a one-piece fishing rod handle. The one-piece handle is molded with preformed rod components such as a reel seat and a trigger portion. However, the handle taught by U.S. Pat. No. 4,920,682 must have a body with a hole axially extending therethrough to fixably receive a fishing rod blank. The one-piece handle has the disadvantage of requiring a hole be formed in the handle body and that the rod be inserted into the hole or that the handle be formed around the rod. This results in increased time to assemble the finished fishing rod which translates into low productivity and increased labor costs. Additionally, quality control issues, such as misalignment of the handle and rod or defective attachment of the handle to the rod, exist. Furthermore, the addition of the handle taught by U.S. Pat. No. 4,920,682 adds weight to the rod and processing cost to the rod.

There is a need for a unitary fishing rod with integral features that avoids the aforementioned shortcomings of rods manufactured by conventional mandrel wrapping methods.

OBJECTS OF THE INVENTION

It is an object of the present invention to provide a unitary fishing rod with integral features, the shape of which is not limited by conventional mandrel wrapped manufacturing methods.

It is another object of the invention to provide a fishing rod with either raised or recessed surface detail, or both raised or recessed surface detail, wherein the detail includes but is not limited to, friction means, bumps, dimples, ridges, thread means, lines, circles, crosshatches, patterns, letters, words and logotypes or any other raised or recessed surface detail that is an integral feature of a unitary rod, thus, eliminating the need for secondary machining, printing or other processing to produce a unitary rod with integral features.

A further object of the invention is to provide a fishing rod wherein the cross-section shape is comprised of at least one of the following: oval, oblong, circle, hexagon, rectangle, square, triangle, octagon, or transition shape which are integral features of a unitary rod.

Another object of the invention is to provide a unitary fishing rod with an integral multiple axes of alignment feature.

Still a further object of the invention to provide a fishing rod with an integral handle means feature that is a part of a unitary fishing rod.

Yet another object of the invention is to provide a unitary fishing rod having one or more integral internal ribs, extending the entire length or a portion of the entire length of the rod, that provide unique flex characteristics, such as substantially reduced lateral flex, or increased handle strength.

It is yet another object of the invention to provide a unitary rod with integral ferrule features, so that when the rod is properly cut into sections it may be easily reassembled as a multi-section rod by joining the ferrules.

It is yet another object of the invention to provide a unitary rod with an integral solid tip feature.

SUMMARY OF THE INVENTION

This invention relates to a unitary fishing rod having at least one of the following integral features: either raised or recessed surface details or both raised and recessed surface details, circular or non-circular cross-sectional shapes, raised rod guide mounting portion, multiple axes of alignment, handle means, one or more internal ribs, solid tip, or integral ferrule features. All of the above mentioned features are integral to the rod so as to form a unitary fishing rod with integral features that is stronger, lighter, with improved feel characteristics, and is both easier and less expensive to produce than rods manufactured by conventional mandrel wrapping methods.

A unitary fishing rod with integral features, such as raised or recessed surface details, is advantageous because the surface details may act as either or both a finish or friction means. Conventional rods made by the mandrel wrapping method require addition processing to produce a rod with a finish and or friction means. Additional processing of conventional rods made by the mandrel wrapping method both adds weight to the rod and increase the cost of producing the rod. Therefore, unitary fishing rods with integral surface detail features provide a rod with a finish and or a friction means that is lighter and less expensive to manufacture than conventional rods made by the mandrel wrapping method.

The unitary fishing rod of the invention may have one or more cross-sectional shapes integrally formed in a single rod blank.

Multiple axes of alignment are advantageous because they permit fishing rod handles or other integral features to be offset from the main axis of alignment, permitting a more ergonomical unitary rod design.

A unitary fishing rod having one or more integral internal rib features is advantageous because an internal rib or ribs serve to strengthen the rod as well as provide unique rod flexibility characteristics, such as, substantially reduced unique lateral flex as well as increased handle strength.

BRIEF DESCRIPTION OF THE DRAWINGS

In the drawings:

FIG. 1 is a lengthwise profile of a unitary fishing rod with integral features of a first preferred embodiment of the invention showing a unitary fishing rod with integral thread means feature and integral gripping means feature along the length of a unitary fishing rod.

FIG. 2 is an enlarged view of a portion of a first preferred embodiment of the invention showing thread means and gripping means having a friction means as integral features of a unitary fishing rod.

FIG. 3 is a lengthwise cross-sectional view of a portion of a first preferred embodiment of the invention showing thread means and gripping means as integral features of a unitary fishing rod.

FIG. 4 is a lengthwise profile of a unitary fishing rod with integral features of a second preferred embodiment of the invention showing a unitary fishing rod with a thread means and cross-sections of various shapes as integral features of a unitary fishing rod.

FIG. 5 is a lengthwise profile of a unitary fishing rod with integral features showing a third preferred embodiment of the invention, an integral offset axis feature of a unitary fishing rod.

FIG. 6(*a* & *b*) show a lengthwise profile of a unitary fishing rod with integral features showing a fourth preferred embodiment of the invention, an integral multiple axes feature of a unitary fishing rod. FIG. 6*a* shows a unitary rod with integral features where the rod portions aligned about the multiple axes are straight. FIG. 6*b* shows a unitary rod with integral features where the center rod portion is aligned about a curved axis and the two rod portions adjacent to the center portion are aligned about straight axes.

FIG. 7 is a cross-section view of a fifth preferred embodiment of the invention, a portion of a unitary fishing rod with integral features having a both a curved axis and more than one axially aligned cross-sectional shape as integral features of a unitary rod.

FIG. 8 is a lengthwise profile of a unitary fishing rod with integral features of a sixth preferred embodiment of the invention showing an integral conical portion feature and an integral handle means feature of a unitary fishing rod.

FIG. 9 is an enlarged lengthwise cross-section view of the handle means of a sixth preferred embodiment of the invention showing a unitary rod having an integral conical portion feature and an integral handle means feature having a thread means, trigger portion, gripping means, recessed undercut, and reel bed portion.

FIG. 10 is a handle means portion of the rod showing a seventh preferred embodiment of the invention, a unitary fishing rod with integral handle means with offset grip axis feature.

FIG. 11 is an angled view of an eighth preferred embodiment of the invention showing a cutaway portion of a unitary fishing rod with integral features having more than one integral internal rib feature.

FIG. 12 is an angled view of a ninth preferred embodiment of the invention showing a cutaway portion of a unitary fishing rod with integral features having one integral internal rib feature.

FIG. 13 (*a* & *b*) shows a cross-section view of a tenth-preferred embodiment of the invention, a unitary fishing rod with integral ferrule features that may be cut and then assembled, at an integral put-in ferrule, into a multi-section fishing rod with integral ferrule features. FIG. 13*a* shows the cut lines on an uncut unitary fishing rod with integral ferrule features. FIG. 13*b* shows the assembled multi-sections with integral ferrule features.

FIG. 14(*a* & *b*) shows a cross-section view of an eleventh preferred embodiment of the invention, a unitary fishing rod with integral ferrule features that may be cut and assembled, at an integral put-over ferrule, into a multi-section fishing rod with integral ferrule features. FIG. 14*a* shows the cut lines on an uncut unitary fishing rod with integral ferrule features. FIG. 14*b* shows the assembled multi-sections with integral ferrule features.

FIG. 15(*a* & *b*) shows a cross-section view of a tenth preferred embodiment of the invention, a unitary fishing rod with integral ferrule features that may be cut and assembled, at an integral telescopic ferrule, into a multi-section fishing rod with integral ferrule features. FIG. 15a shows the cut lines on an uncut unitary fishing with integral ferrule features. FIG. 15b shows the assembled multi-sections with integral ferrule features.

FIG. 16(a, b & c) illustrates a blow molding method of making a unitary fishing rod with integral features of the invention. FIG. 16a illustrates the unassembled parts of a mold and a rod sock. FIG. 16b illustrates an assembled mold with a rod sock in place. FIG. 16c illustrates an assembled mold and rod sock while fluid is being forced into the rod sock.

FIG. 17(a, b & c) illustrates a bladder molding method of making a unitary fishing rod with integral features of the invention. FIG. 17a illustrates the unassembled parts of a mold, a rod sock, and a bladder. FIG. 17b illustrates an assembled mold rod sock and bladder in place. FIG. 17c illustrates an assembled mold, rod sock, and bladder in place while fluid is being forced into the bladder.

FIG. 18 is a cross-section view of a portion of a thirteen embodiment of the invention showing a solid tip as an integral feature of a unitary fishing rod.

FIG. 19(a & b) illustrates a bladder mold's usefulness in the manufacture of a unitary fishing rod with the integral feature of a solid tip, the thirteenth preferred embodiment of the invention. FIG. 19a is an enlarged cross-sectional view showing the assembled mold, the rod sock having a sufficient amount of uncured material deposited in the tip of the rod sock and one bladder. FIG. 19b is an enlarged cross-sectional view showing the assembled mold, the rod sock having a sufficient amount of uncured material deposited in the tip of the rod sock and one bladder while fluid is being forced into the bladder inside the cavity formed by the mold.

FIG. 20(a & b) illustrates a bladder mold's usefulness in the manufacture of a unitary fishing rod with the integral feature of more than one internal rib, the eighth preferred embodiment of the invention. FIG. 20a is an enlarged cross-sectional view showing a portion of the unassembled mold, the rod sock, three bladders, and the more than one internal rib of the rod blank. FIG. 20b is an enlarged cross-section view showing the assembled mold, the rod sock, three bladders, and the more than one internal rib of the rod blank while fluid is being forced into the three bladders inside the cavity formed by the mold assembly.

FIG. 21(a & b) illustrate a bladder mold's usefulness in the manufacture of a unitary fishing rod with the integral feature of one internal rib, the ninth preferred embodiment of the invention. FIG. 21a is an enlarged cross-sectional view showing a portion of the unassembled mold, the rod sock, two bladders, and the one internal rib of the rod blank. FIG. 21b is an enlarged cross-section view showing the assembled mold, the rod sock, two bladders, and the one internal rib of the rod blank while fluid is being forced into the two bladders inside the cavity formed by the mold assembly.

The same reference numbers refer to the same part throughout the various Figures.

DESCRIPTION OF THE INVENTION

The unitary fishing rod with integral features of this invention is formed by pressing appropriate rod forming material against the interior cavity surface of a mold. The interior shape and relief of the mold's interior surfaces define the external integral features, the shape and surface detail, of the unitary fishing rod. For example, raised or recessed surface details may be formed as an integral feature of a unitary rod where the interior cavity surface of the mold has, in relief, a mirror image of the feature or features to be imparted to the rod. Integral formation of raised or recessed surface detail features on a unitary rod is the result of the transfer of the surface detail features in relief on mold's interior cavity surface to the rod. Once the molding method is complete, the raised or recessed surface detail is an integral feature of the finished unitary fishing rod.

One or more integral internal rib features are defined by loosely assembling ribs inside an expandable rod sock of uncured material, placing bladders within the chambers formed by the ribs, injecting fluid into the bladders and curing the rod sock and ribs. A unitary rod with one or more integral internal rib feature may also have external integral features defined by the shape and surface detail of the mold.

Appropriate materials for use in forming the unitary rod with integral features of the invention include resin, polymer, impregnated fibers of fiberglass, carbon, boron or the like, or any other natural or artificial reinforced or non-reinforced single or mixed materials in braided, woven, nonaligned or sheet form that, in an uncured state, can be molded to form the desired unitary rod with integral features. Preferred materials are fiberglass, carbon or a fiberglass and carbon mix of resin impregnated fibers. Use of appropriate rod forming material will result in a unitary fishing rod with integral features having one or more of the following desired properties: stiffness, strength, flexibility, and lightness.

FIGS. 16a, b and c illustrate one method of producing a unitary fishing rod with integral features of the invention by the process of blow molding. (FIGS. 16a, b and c are not shown to scale.)

Mold 1242 is formed in three parts 1242a, 1242b and 1242c such that when the mold parts are assembled as indicated by the arrows, resulting cavity 1243 is formed. (See FIGS. 16a and b.) Mold parts 1242a, 1242b and 1242c have interior mold surfaces 1244a, 1244b and 1244c, respectively. The shape and relief of interior mold surfaces 1244a, 1244b and 1244c define the external integral features, the shape and surface detail, of the unitary fishing rod. Fixed to mold part 1242c is a fluid inflow duct 1245. Mold part 1242b has a fluid outflow vent 1249. (See FIGS. 16a and b.)

Mold 1242 is preferably formed from metal and also preferably includes suitable means for facilitating alignment of mold parts 1242a, 1242b, and 1242c. Pins are one example of suitable alignment means. Pins 1247a, b and c are received by depressions 1248a, b and c, respectively, in the opposing mold section. (See FIG. 16a.) When the mold parts are assembled, pins serve to properly align the mold cavity 1243. (See FIG. 16b.) It is understood, however, that other suitable mold part alignment means may be used in association with or in place of pins.

When assembling mold 1242, an flexible rod sock of uncured material 1241 is positioned within the cavity 1243 of mold 1242 such that when the mold parts are assembled, rod sock top 1246 is held positionally fixed relative to mold part 1242c of mold 1242. (See FIGS. 16a and b.)

When mold 1242 is closed with rod sock 1241 held as described, fluid is injected into the rod sock urging it into contact with the interior mold cavity surface 1244. (See FIG. 16c.) Rod sock 1246 holds the uncured material inside the sock while the fluid is injected into the rod sock. Fluid trapped in mold cavity 1243 escapes though fluid outflow vent 1249. Air is the preferred fluid. As the rod sock is pressed against the interior mold surfaces 1444a, b and c, the uncured material takes the shape and detail of the interior mold surfaces. Curing is accomplished using standard methods. In preferred methods of the present invention, curing takes place between about 15° and about 300° C. Optimal curing takes place between about 100° and about 160° C. After rod sock 1241 is cured, mold 1242 is opened, and rod sock 1241 is removed. The cured rod sock is the unitary fishing rod with integral features of the invention. (See FIGS. 16a, b, and c.)

FIGS. 17a, b and c illustrate a bladder molding method of manufacturing a unitary fishing rod with integral features. (FIGS. 17a, b and c not shown to scale.) The process is substantially the same as previously described for blow molding.

When blow molding is used to form the unitary rod of the present invention, fluid is forced into the rod sock of uncured rod forming material, urging it into contact with the interior mold surfaces 1244a, b and c. (See FIG. 16c.) In contrast, when bladder molding is used to form the unitary rod, an flexible bladder 1352 is inserted into the rod sock 1351. (See FIGS. 17a and b.) Fluid is forced through fluid inflow duct 1245 into flexible bladder 1352 which fills rod sock 1351 urging it into contact with the interior mold cavity surfaces 1244a, b and c. Air present in mold cavity 1243 escapes through fluid outflow vent 1249 as rod sock 1351 is urged into contact with the interior mold cavity surfaces 1244a, b, and c. (See FIG. 17c.) Air is the preferred fluid. As the rod sock material is pressed against mold cavity surfaces 1244a, b and c, the rod forming material of rod sock 1351 cures fixed to the shape of interior mold surfaces. Curing is accomplished using standard methods described above. After rod sock material 1351 is cured, it is removed from mold 1242 along with flexable bladder 1352. Flexable bladder 1352 is then removed from the cured rod sock leaving the unitary fishing rod with integral features of the invention.

A unitary fishing rod with a solid tip feature may be made, for example, by bladder molding. FIGS. 19a and b (not shown to scale) illustrate a bladder molding method that may be used to manufacture a unitary fishing rod with a solid tip feature. (See also FIG. 18.) The process is substantially the same as previously described for bladder molding.

When assembling mold 1242, an flexible rod sock of uncured material 1441 is positioned within cavity 1243 of mold 1242 such that when the mold parts are assembled, the rod sock top 1446 is held positionally fixed relative to mold part 1242c of mold 1242. (See FIGS. 19a & b.) A sufficient amount of uncured material 1489 is deposited in the tip of sock 1441 to provide an integral solid tip feature of the unitary rod. Bladder 1352 is inserted in rod sock 1441. (See FIG. 19a.) Fluid is forced through inflow duct 1245 into expandable bladder 1352 which fills sock 1441 urging it into contact with the interior mold cavity surfaces 1244a, b and c. (See FIG. 19b.) Air is the preferred fluid. As the rod sock material is pressed against mold cavity surfaces 1244a, b and c, the rod forming material cures fixed to the shape of the interior mold surfaces and solid tip 1499 is formed. Curing is accomplished using standard methods described above. After rod sock material 1441 is cured, it is removed from mold 1242 along with expandable bladder 1352. Expandable bladder 1352 is then removed from the cured rod sock leaving the unitary fishing rod with integral a solid tip feature of the invention.

A unitary fishing rod with one or more internal rib integral features may be manufactured, for example, by bladder molding. FIGS. 20a and b illustrate a bladder molding method that may be used to manufacture a unitary fishing rod with more than one integral internal rib feature. (See also FIG. 11.)

Ribs 705 are loosely assembled inside the expandable rod sock 1351 making three chambers within the rod sock. One expandable bladder 1352 a, b or c is then inserted within each chamber. (See FIG. 20a.) Thereafter, the process is substantially the same as previously described for bladder molding. Mold parts 1242a, b and c are aligned. Fluid is forced at equal pressure into bladders 1352a, b and c. Fluid pressure expands bladders 1352a, b and c pressing ribs 705 into contact with rod sock 1351 forcing ribs 705 to become fused therewith. As the rod sock material is urged into contact with mold interior surfaces 1244a, b and c, the rod forming material of rod sock 1351 cures fixed to the shape of mold interior surfaces. Curing is accomplished using standard methods. After rod sock 1351 is cured, it is removed from mold 1242 along with bladders 1352a, b and c. Bladders 1352a, b and c are then removed from the cured rod sock, leaving the unitary fishing rod with more than one integral rib feature of the invention.

A unitary fishing rod with one integral internal rib feature may be manufactured, for example, by bladder molding. FIGS. 21a and b illustrate a bladder molding method that may be used to manufacture a unitary fishing rod one integral rib feature. (See also FIG. 12.) The method of manufacturing a unitary fishing rod with one integral rib feature is substantially similar to the method previously described for a unitary fishing rod with more than one integral rib feature.

Rib 805 is loosely assembled inside expandable rod sock 1351 making two chambers within the rod sock. Expandable bladder 1452a is then inserted into the first chamber and expandable bladder 1452b is inserted into the second chamber. (See FIG. 21a.) Thereafter, the process is substantially the same as previously described for a unitary rod with more than one integral internal rib feature, and will not be repeated here. (See FIG. 21b.) After rod sock 1351 is cured it is removed from the mold along with both bladders. The two bladders are removed from the cured rod sock leaving the unitary fishing rod with one integral internal rib feature of the invention.

Description of a First Preferred Embodiment

FIGS. 1, 2 and 3 illustrate a first preferred embodiment of the invention showing a unitary fishing rod 10 with integral thread means feature 11, integral gripping means 12 having friction means feature 14, and integral smooth conical portion feature 13. (FIGS. 1, 2 and 3 are not shown to scale.)

Integral thread means feature 11 is of circular cross-section. Integral gripping means feature 12 may be any cross-sectional shape, including but not limited to, oval, oblong, circle, hexagon, rectangle, square, triangle, octagon, or a transition shape. Transitional shapes exist where the unitary fishing rod changes from one cross-sectional shape, e.g. hexagonal, to another cross-sectional shape, e.g. circular. Integral gripping means feature 12 has integral friction means feature 14, which serves to enhance a fisherman's grip on a portion of the rod. Friction means feature 14 is shown as a series of bumps. Other friction means include, but are not limited to, dimples, ridges, threads, lines, circles, cross-hatches, patterns, including but not limited to, hide patterns, graphic designs, letters, words, or logotypes.

Description of a Second Preferred Embodiment

The unitary fishing rod 110 of FIG. 4 (not shown to scale) shows a unitary rod of the invention having the following integral features: circular cross-section thread means 111 (across line 4A) transitioning to oval grasping means 112

(across line 4B) transitioning to circular cross-sectioned, threaded means 111 (across line 4A') transitioning to hexagonal portion 115 (across line 4C) transitioning to conical portion 113 (across line 4D) transitioning to raised rod guide mounting portion 118 (across line 4E) (rod guide not shown), and transitioning to conical portion 113 (across line 4D').

Integral transitional shape features exist where the unitary fishing rod changes from one integral feature to the next integral feature. For example, the unitary fishing rod of the invention has an integral transitional shape feature where the rod cross-section transitions from circular cross-section feature 4A to integral oval grasping means feature 4B. (See FIG. 4.)

Description of a Third Preferred Embodiment

Fishing rod 410 of FIG. 5 (which is not shown to scale) shows a unitary fishing rod of the invention having a first rod portion 483 and a second rod portion 484. Both the first and the second rod portions are integral features of the unitary fishing rod. First rod portion 483 is aligned about a first axis A which intersects second rod portion 484 aligned about a second axis B. First axis A intersects second rod axis B such that the angle formed by first axis A and second rod axis B does not equal zero. An axis is an imaginary line passing through the center of the unitary rod portion. Axes of alignment include, but are not limited to, straight, curved, or coiled axes. The junction of axes can be abrupt (See FIG. 5) or gradual (not shown) providing a curvilinear aspect to those respective portions of the rod.

Description of a Fourth Preferred Embodiment

Fishing rod 510 of FIGS. 6a and b (which are not shown to scale) show a unitary fishing rod with multiple rod portions 594, 595 and 596, each rod portion being an integral feature of the unitary fishing rod. Multiple rod portions 594, 595, and 596 have corresponding, axes A1, B and A2 in turn. First axis A1 intersects second axis B, such that the angle formed by first axis A1 and second axis B does not equal zero. Second axis B intersects third axis A2, such that the angle formed by second axis B and third axis A2 does not equal zero. FIG. 6a shows a unitary rod with integral features where rod portions 594, 595 and 596 are straight. FIG. 6b shows a unitary rod with integral features where rod portions 594 and 596 are straight and the rod portion 595 is curved. An axis is an imaginary line passing through the center of the unitary rod portion. Axes of alignment include, but are not limited to, straight, curved, or coiled axes. The junction of axes can be abrupt (see FIGS. 6a & b) or gradual (not shown) providing a curvilinear aspect to those respective portions of the rod.

The unitary fishing rod with an integral multiple axes feature may have any number of integral axes of alignment features. The unitary fishing of this invention may have more than one rod portion wherein each said rod portion is aligned about a corresponding axis wherein each said rod portion is sequentially aligned so that each said rod portion intersects with the adjacent said rod portion such that the angle formed between the adjacent said rod portions does not equal zero. An axis is an imaginary line passing through the center of the unitary rod portion. Axes of alignment include, but are not limited to, straight, curved, or coiled axes. The junction of axes can be abrupt or gradual providing a curvilinear aspect to those respective portions of the rod.

Description of a Fifth Preferred Embodiment

Fishing rod 610 of FIG. 7 (which is not shown to scale) shows a portion of a unitary fishing rod having integral curved axis feature 601, multiple cross-sectional shapes feature 602, integral handle means feature 605 having recessed undercut 603, reel bed 604, and thread means 611.

The unitary rod with integral features has forward portion 606 and handle means portion 605. In one aspect of the fifth embodiment, forward portion 606 is angled with respect to handle means portion 605 such that the angle formed between forward portion 606 and handle means portion 605 is about 15 to about 25 degrees such that the net change from forward portion 606 to second handle means portion 605 is gradual and not at a single point.

In another aspect, the fifth embodiment of the invention handle means 605 has an oval cross-section (across line 7C). Oval 7C has minor axis X and major axis Y wherein the ratio of X to Y is about 1.2 to about 1.3.

Description of a Sixth Preferred Embodiment

Fishing rod 210 of FIG. 8 (which is not shown to scale) shows a unitary rod having an integral conical portion feature 213 and an integral handle means feature 251. Integral handle means feature 251 has thread means 211, trigger portion 252, gripping means 253, recessed undercut 254, and reel bed portion 256. (See FIG. 9.) Integral handle means feature 251 has a hole 255 which is required to mold the fishing rod as described. (See FIG. 9.) Threaded means 211, trigger portion 252, gripping means 253, recessed undercut 254, and reel bed portion 256 are all integral features of integral handle means feature 251, and, thus, integral features of the unitary fishing rod of the invention.

Description of a Seventh Preferred Embodiment

Fishing rod 310 of FIG. 10 shows a portion of a unitary fishing rod having integral conical portion feature 313, and integral handle means feature 371. Integral handle means feature 371 of the unitary rod has an integral gripping means feature 372 and integral thread means 311. Gripping means axis B intersects rod axis A, such that the angle formed by gripping means axis B and rod axis A does not equal zero.

Description of a Eighth Preferred Embodiment

FIG. 11 is a cutaway drawing showing a portion of unitary fishing rod 700 having more than one integral internal rib feature. Rod portion 700 is formed to include more than one integral rib 705 aligned inside the fishing rod to add strength and rigidity to the unitary fishing rod. The unitary fishing rod of the invention may have more than one integral internal rib feature extending the entire length of the rod or a portion thereof.

Description of a Ninth Preferred Embodiment

FIG. 12 is a cutaway drawing showing a portion of unitary fishing rod 800 having one integral rib feature 805. With a single strengthening rib, the rod possesses greatly reduced lateral flex with minimal affect to the vertical flex of the fishing rod. The unitary fishing rod of the invention may have one integral internal rib feature extending the entire length of the rod or a portion thereof.

Description of a Tenth Preferred Embodiment

FIGS. 13a and b illustrates a tenth preferred embodiment of the invention in which a unitary fishing rod with integral ferrule features may be cut apart to provide ferruled rod sections that may be assembled as a multi-segment fishing rod with integral features. (FIGS. 13a and b are not shown to scale.)

Unitary fishing rod 910 has, as integral features, first rod portion 931 having female ferrule portion 930, temporary rod portion 933, second rod portion 932 having male ferrule portion 934. (See FIG. 13a.) After unitary fishing rod 910 is formed and cured, it is cut apart at cutting lines C1, so that temporary rod portion 933 may be discarded allowing female ferrule portion 930 of first rod portion 931 to be joined to male ferrule portion 934 of second rod portion 932 as ferrule 935 in a configuration conventionally known as a put-in ferrule. (See FIG. 13b.)

FIGS. 13a and b illustrate the process for only two ferrule-joined sections, but it is understood that any number of ferrules may be integral features of a unitary fishing rod, allowing the rod to be cut into multiple portions that may then be joined using put-in ferrules. Furthermore, this embodiment of the invention may have additional integral features, including but not limited to, an integral handle means feature, integral friction means feature, or one or more integral internal rib features.

Description of an Eleventh Preferred Embodiment

FIGS. 14a and b illustrates an eleventh preferred embodiment of the invention in which a unitary fishing rod with integral features may be cut apart to provide ferruled rod portions for a multi-section fishing rod with integral features. (FIGS. 14a and b are not shown to scale.)

Unitary fishing rod 1010 has, as integral features, first rod portion 1031 having male ferrule portion 1030, temporary rod portion 1033, and second rod portion 1032 having female ferrule portion 1034. (See FIG. 14a.) After unitary fishing rod 1010 is formed and cured, it is cut apart at cutting lines C2, so that temporary rod portion 1033 may be discarded allowing male ferrule portion 1030 of first rod portion 1031 to be joined to female ferrule portion 1034 of second rod portion 1032 as ferrule 1035 in a configuration conventionally known as a put-over ferrule. (See FIG. 14b.)

FIGS. 14a and b illustrate the process for only two ferrule-joined portions, but it is understood that any number of ferrules may be integral features of a unitary fishing rod, allowing the rod to be cut into multiple sections which may then be joined using a put-over ferrule. Furthermore, this embodiment of the invention may have additional integral features, including but not limited to, an integral handle means feature, integral friction means feature, or one or more internal rib features.

Description of a Twelfth Preferred Embodiment

FIG. 15 illustrates a twelfth preferred embodiment of the invention in which a unitary fishing rod with integral features may be cut apart to provide ferruled rod portions for a multi-section, fishing rod with integral features. (FIGS. 15a and b are not shown to scale.)

Rod blank 1110 has, as integral features, first rod portion 1131 having female ferrule portion 1130, temporary rod portion 1133, and second rod portion 1132 having male ferrule portion 1134. (See FIG. 15a.) After unitary fishing rod 1110 is formed and cured, it is cut apart at cutting lines C3 so that temporary rod portion 933 may be discarded permitting female ferrule portion 1130 of first rod portion 1131 to be joined to male ferrule portion 1134 as ferrule 1137 in a configuration conventionally known as a telescopic ferrule. (See FIG. 15b.)

FIGS. 15a and b illustrate the process for only two ferrule-joined portions, but it is understood that any number of ferrules may be integral features of a unitary fishing rod, allowing the rod to be cut into multiple sections which may then be joined at telescopic ferrules. Furthermore, this embodiment of the invention may have additional integral features, including but not limited to an integral handle means feature, integral friction means feature, or a solid tip.

A multi-section rod with integral features may have sections joined by either a put-in, put-over, or telescopic ferrules in any combination.

Description of a Thirteenth Embodiment

FIG. 18 illustrates a portion of a thirteenth embodiment of the invention, a unitary fishing rod 1410 with an integral solid tip feature 1499. (FIG. 18 not shown to scale.)

While the preferred embodiments of the invention have been shown and described, it will be obvious to those skilled in the art that changes and modifications may be made therein without departing from the spirit of the invention, the scope of which is defined by the appended claims.

What is claimed is:

1. A unitary fishing rod comprising
a first handle portion,
said handle portion extending along a first straight axis A;
said handle portion having a substantially circular cross section at a first end transforming to an oval-shaped cross-section at a second end,
said handle portion having first, second and third integral features,
wherein said first integral features are integral threads formed on said first end of said handle portion;
wherein said second integral feature is an integral reel bed formed adjacent to said integral threads,
wherein said third integral feature is a recessed undercut formed in said second end of said handle portion, adjacent to and extending partially over said reel bed,
a second angular transition portion integrally extending from said second end of said handle portion,
said second transition portion extending along a gradually curved axis,
said second transition portion having a substantially oval-shaped cross-section throughout,
a third tapering portion integrally extending from said second angular transition portion,
said third tapering portion tapering from a first larger oval-shaped cross section at the integral junction between said second angular transition portion and said third tapering portion to a smaller circular cross section,
said third tapering section extending along a straight axis B, and
a fourth rod section integrally extending from said third tapering portion,
wherein said fourth rod section has a substantially circular cross-section throughout,
wherein said fourth rod section extends along said straight axis B.

2. The unitary fishing rod of claim 1 wherein the angle formed by the intersection of said first axis A and said second axis B is between about 15 and 25 degrees.

3. A unitary fishing rod comprising
a first handle portion,
said handle portion extending along a first straight axis A;
said handle portion having a substantially circular cross section at a first end transforming to an oval-shaped cross-section at a second end, said handle portion having first, second and third integral features,
wherein said first integral features are integral threads formed on said first end of said handle portion;
wherein said second integral feature is an integral reel bed formed adjacent to said integral threads,
wherein said third integral feature is a recessed undercut formed in said second end of said handle portion, adjacent to and extending partially over said reel bed,
a second angular transition portion integrally extending from said second end of said handle portion,
said second transition portion extending along a gradually curved axis,
said second transition portion having a substantially oval-shaped cross-section throughout,
a third tapering portion integrally extending from said second angular transition portion,
said third tapering portion tapering from a first larger oval-shaped cross section at the integral junction between said second angular transition portion and said third tapering portion to a smaller circular cross section,
said third tapering section extending along a straight axis B, and
a fourth rod section integrally extending from said third tapering portion,
wherein said fourth rod section has a substantially circular cross-section throughout,
wherein said fourth rod section extends along said straight axis B,
and wherein said first handle portion, second transition portion, third tapering portion and fourth rod section and said first, second and third integral features on said first handle portion are formed into said unitary rod by a molding process selected from the group consisting of bladder molding and blow molding.

4. The unitary fishing rod of claim 3 wherein the angle formed by the intersection of said first axis A and said second axis B is between about 15 and 25 degrees.

* * * * *